United States Patent [19]
Kim

[11] Patent Number: 5,886,828
[45] Date of Patent: Mar. 23, 1999

[54] ZOOM LENS SYSTEM

[75] Inventor: Moon-Hyun Kim, Kyeongsangnam-do, Rep. of Korea

[73] Assignee: Samsung Aerospace Industries, Ltd., Changwon, Rep. of Korea

[21] Appl. No.: 992,221

[22] Filed: Dec. 17, 1997

[30] Foreign Application Priority Data

Dec. 19, 1996 [KR] Rep. of Korea ...................... 96-67904

[51] Int. Cl.$^6$ .................................................. G02B 15/14
[52] U.S. Cl. ........................................... 359/687; 359/684
[58] Field of Search ................................... 359/683, 687, 359/677, 708, 684

[56] References Cited

U.S. PATENT DOCUMENTS 5,235,466  8/1993  Ono et al. ................................. 359/684

FOREIGN PATENT DOCUMENTS

| | | |
|---|---|---|
| 61-178917 | 8/1986 | Japan . |
| 63-44614 | 2/1988 | Japan . |
| 63-123009 | 5/1988 | Japan . |
| 5-72474 | 3/1993 | Japan . |
| 7-270684 | 10/1995 | Japan . |
| 8-5920 | 1/1996 | Japan . |
| 3-259209 | 11/1997 | Japan . |

*Primary Examiner*—Scott J. Sugarman
*Attorney, Agent, or Firm*—Howrey & Simon

[57] ABSTRACT

A zoom lens system, includes a first lens group of a positive refractive power viewed from the object's side having a concave lens and convex lens adhered to the concave lens and at least two meniscus lenses whose entrance surfaces are convex; a second lens group of a negative refractive power; a third lens group of a positive refractive power having at least one biconvex aspherical lens, at least one convex lens and a concave lens; and a fourth lens group of a positive refractive power having one concave lens and two convex lenses. The second lens group is movable for changing the magnification, and the fourth lens group is movable for compensating the shift of an image plane caused by the movement of the second lens group and for focusing an image.

3 Claims, 8 Drawing Sheets

ZOOM LENS SYSTEM

BACKGROUND OF THE INVENTION (a) Field of the Invention

The present invention relates to a zoom lens system, more particularly to a zoom lens system capable of high magnification with a high F-number as well as a high resolution.

(b) Description of the Related Art

Generally, a digital camera uses either a CCD (Charge Coupled Device) or a charge tube of a small charge area to form an image of an object. The digital camera converts the formed image into electrical signals. For the above reason, the digital camera uses bright lenses as picture-taking lenses.

Moreover, the digital camera needs optical members such as an optical low-pass filter, or an infra-red cut filter between the picture-taking lenses and the CCD. Also, the digital camera needs optical devices such as a tricolor separation prism to form each image of the three primary colors of red, green and blue onto each CCD for a three-plate digital camera. Therefore, the digital camera requires a longer back focal length than a focal length to accommodate optical devices, such as the above-mentioned tricolor separation prism.

Also, as the need for photographing moving objects increases, digital cameras have used a high magnification zoom lens system as a picture-taking lens. A general zoom lens system of a digital camera includes a first lens group of a positive refractive power which is fixed, a second lens group of a negative refractive power which is movable along an optical axis for magnification changes, a third lens group of a negative refractive power which is movable along an optical axis to maintain an image plane during magnification changes, and a fourth lens group of a positive refractive power which is fixed.

In recent years, as digital cameras have used electric motors to move the lenses for focusing, it has become necessary to limit the size and weight of the first lens group. Thus, an inner focusing method is generally used. The inner focusing method allows compact and lighter-weight lens groups while maintaining a total length of the optical system, which enables a small motor to move the lens groups.

Conventional four-lens-group zoom lens systems employing inner focusing method are disclosed in Japanese Laid-open Patent Application No. Sho 63-44614, Japanese Laid-open Patent Application No. Sho 61-178917, Japanese Laid-open Patent Application No. Sho 63-123009, Japanese Laid-open Patent Application No. Hei 3-259209, Japanese Laid-open Patent Application No. Hei 5-72474, Japanese Laid-open Patent Application No. Hei 7-270684, and Japanese Laid-open Patent Application No. Hei 8-5920.

Japanese Laid-open Patent Application No. Sho 63-44614, Japanese Laid-open Patent Application No. Hei 3-259209, and Japanese Laid-open Patent Application No. Hei 8-5920 disclose a system of four lens groups that has a first lens group of a positive refractive power viewed from the object side which is fixed, second and third lens groups of a negative refractive power which are movable to change a magnification, and a fourth lens group of a positive refractive power which is fixed.

However, the systems disclosed in Japanese Patent Application No. Sho 63-44614, and Japanese Patent Application No. Hei 3-259209 cannot obtain a high resolution because of a large number of aberrations, and cannot achieve a sufficiently long back focal length.

The system disclosed in Japanese Laid-open Patent Application No. Hei 8-5920 is better than the systems disclosed in Japanese Laid-open Patent Application No. Sho 63-44614 and Japanese Laid-open Patent Application No. Hei 3-259209 in terms of back focal length and optical performance. However, the number of lenses in the moving lens groups requires a more powerful motor to move them when changing the magnification. Moreover, in a telephoto mode, the short distance between the second and the third lens groups, which are the magnification changing group and compensating group, respectively, requires a complex mechanical structure that is not easy to implement.

Japanese Laid-open Patent Application No. Sho 63-123009, Japanese Laid-open Patent Application No. Sho 61-178917, Japanese Laid-open Patent Application No. Hei 7-270684, and Japanese Laid-open Patent Application No. Hei 5-72474 disclose four-lens-group systems comprising a first lens group which is fixed, a second lens group which is movable for changing the magnification, a third lens group which is fixed, and a fourth lens group which is movable for both compensating and focusing.

However, the systems dislcosed in Japanese Laid-open Patent Application No. Sho 63-123009, Japanese Laid-open Patent Application No. Sho 61-178917, and Japanese Laid-open Patent Application No. Hei 7-270684 cannot achieve a high resolution due to a large number of aberrations. Also, a number of lenses in the second and fourth groups of the system disclosed in Japanese Laid-open Patent Application No. Hei 7-270684 makes it difficult for a small motor to move the lenses.

Even though the system disclosed in Japanese Laid-open Patent Application No. Hei 5-72474 shows a good optical performance with a simple structure, its aperture ratio is as small as F-2.0 and its employment of a pair of double sided aspherical lenses in the lens groups makes it difficult to manufacture.

SUMMARY OF THE INVENTION

In view of the prior art described above, it is an object of the present invention to provide a simple zoom lens system of a high resolution enough to be able to be used for a digital camera employing a charge tube or CCD, particularly for such CCDs with a large number of pixels that can be used for a high-resolution (definition) television.

It is a further object of the present invention to provide a simple zoom lens system having such a long back focal length enough to accommodate optical elements like various kinds of filters and tricolor separation prism between groups of lenses and a CCD.

To achieve these objects and in accordance with the purpose of the invention, a zoom lens system is disclosed which includes a first lens group of a positive refractive power having a concave lens, a convex lens adhered thereto and at least two meniscus lenses whose entrance surface is convex; a second lens group of a negative refractive power; a third lens group of a positive refractive power having at least one biconvex aspherical lens, at least one convex lens and a concave lens; and a fourth lens group of a positive refractive power having one concave lens and two convex lenses, wherein the second lens group moves from the object to the image for magnification changes, and the fourth lens group moves for compensating an image shift caused by the movement of the second lens group and for focusing an image. Preferably, $2.0 < BFw/fw < 6.0$ $7.5 < f1/fw < 12.5$ −3.0<f2/fw<−1.5

0.8<f3/f4<1.6

55<vd<70 where BFw is a back focal length at the wide angle position, fw is a focal length of the overall zoom lens system of the wide angle position, f1 is a focal length of the first lens group, f2 is a focal length of the second lens group, f3 is a focal length of the third lens group, f4 is a the focal length of the fourth lens group, and vd is an average dispersion value of the first lens group.

BRIEF DESCRIPTION OF THE DRAWINGS

The above objects and features of the present invention will be apparent from the following description of the preferred embodiments with reference to the accompanying drawings, wherein.

DETAILED DESCRIPTION OF THE PREFERRED EMBODIMENTS

Reference will now be made in detail to the preferred embodiments of the present invention, examples of which are illustrated in the accompanying drawings.

Figure 1A:
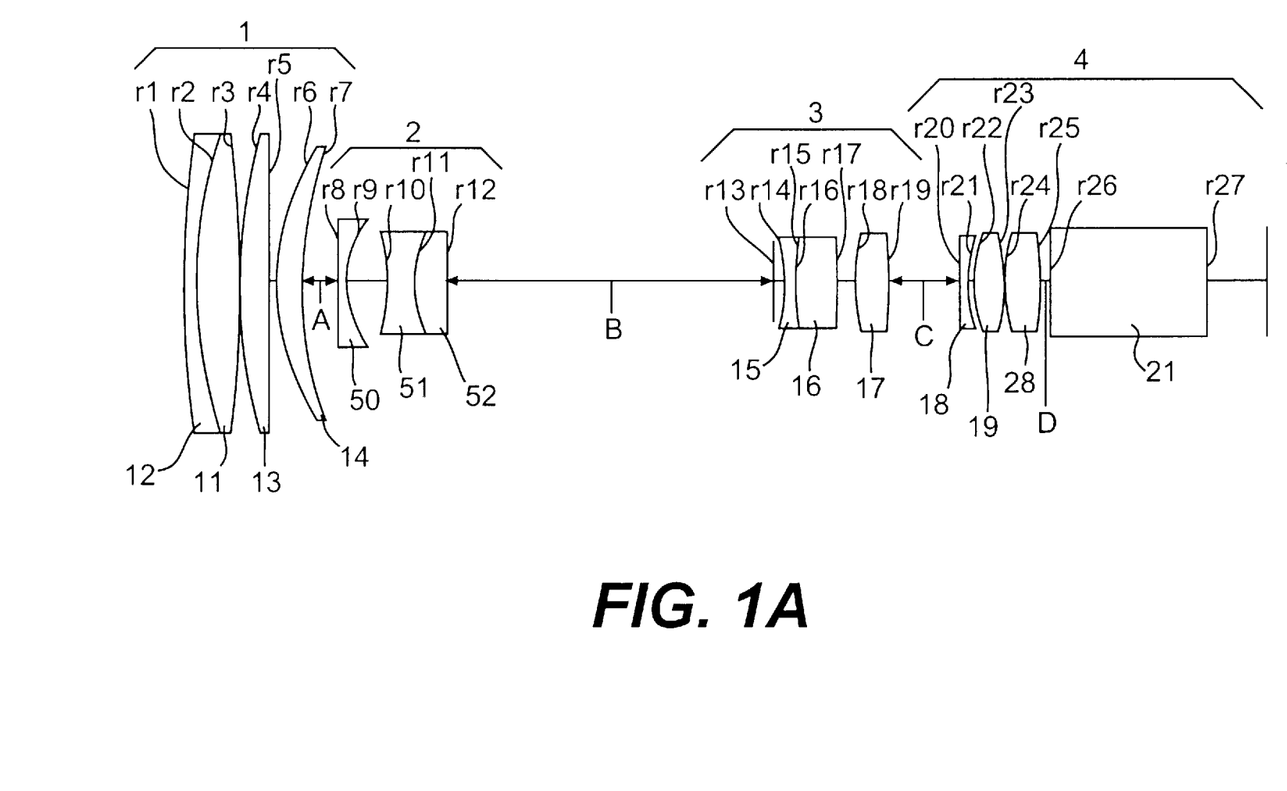
FIG. 1A is a schematic sectional view illustrating a lens group of a zoom lens system at a wide angle position in accordance with the first preferred embodiment of the present invention.

Referring to FIG. 1A, a zoom lens system in accordance with the first preferred embodiment of the present invention includes a first lens group 1 of a positive refractive power viewed from the object side comprising four lenses, a second lens group 2 of a negative refractive power comprising three lenses, a third lens group 3 of a positive refractive power, and a fourth lens group 4 of a positive refractive power. Magnification is changed by moving the second lens group 2 from an object side to an image side, and focusing is accomplished by the fourth lens group 4.

The first lens group 1 has a convex lens 11 and a concave lens 12 attached thereto, and has at least two meniscus lenses 13, 14 which are convex toward an object. The second lens group 2 includes at least three lenses 50, 51, 52. The third lens group 3 has at least one biconvex aspherical lens 16, at least one convex lens 15 and at least one concave lens 17. As shown in FIG. 1A the third lens group 3 has three lenses. The fourth lens group 4 has one concave lens 18, and two convex lenses19, 20. The fourth lens group 4 also may contain a tricolor separation filter 21 which is necessary if a color CCD is employed in the camera. On the other hand, if a black and white CCD is employed, a tricolor separation filter is not necessary.

The operation of the zoom lens system in accordance with the first preferred embodiment of the present invention is as follows.

In the zoom lens system of the present invention, magnification is changed by moving the second lens group 2. The moving of an image plane in accordance with the zooming of the second lens group 2 is compensated by moving the fourth lens group 4. Focusing is also accomplished by moving the fourth lens group 4. Therefore, by increasing the refractive power of the second lens group 2, a high magnification of more than eight times can be realized with a simple combination of lens groups.

A high dispersion value of the first lens group 1 satisfies the conditions of a small magnification chromatic aberration ratio that is required to achieve a high resolution.

Figure 1B:
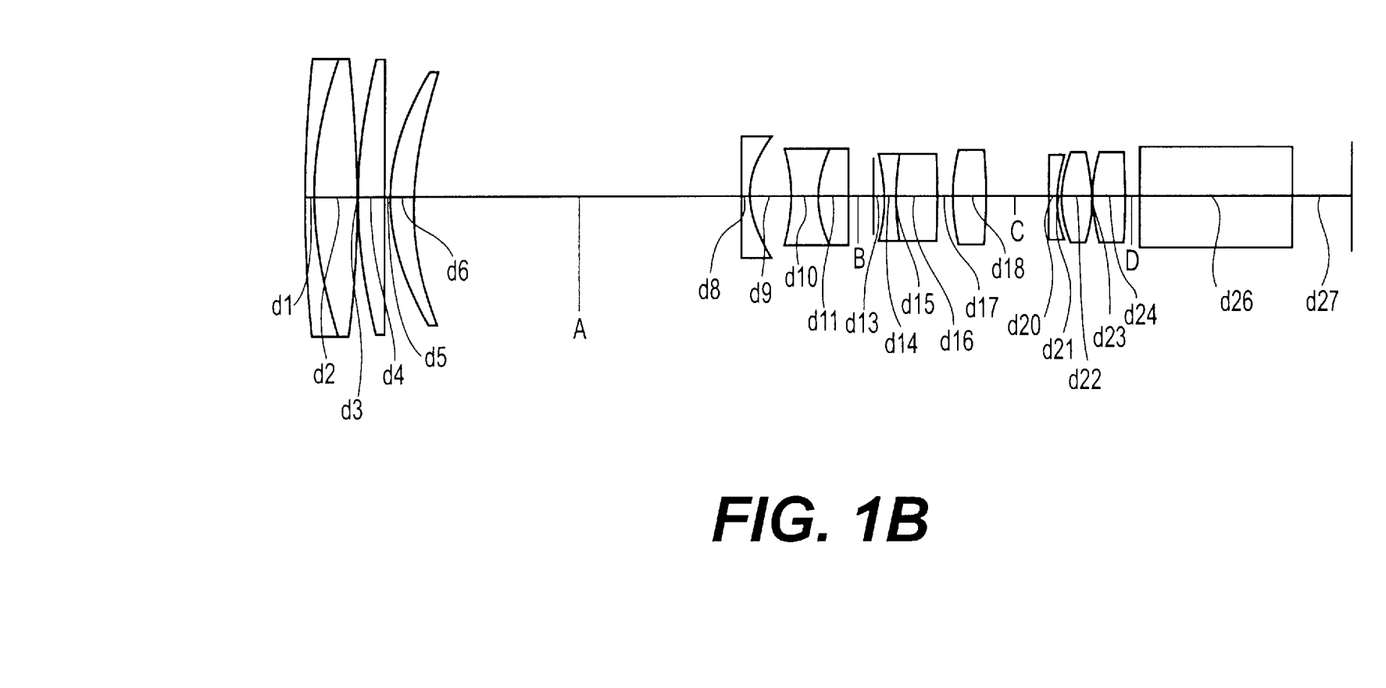
FIG. 1B is a schematic sectional view illustrating the lens group of the zoom lens system at a telephoto position in accordance with the first preferred embodiment of the present invention.

The third lens group has a concave lens 15 of a high negative refractive power. Digital cameras require a sufficiently long back focal length to meet telecentric conditions. In order to achieve telecentric conditions, the imaging position should be placed as far as possible from CCD such that light from the boundary image may impinge upon the CCD at an angle of 90 degrees with respect thereto. The concave lens 15 of a high negative refractive power in the third lens group 3 makes this possible. FIG. 1B shows the distances between and thicknesses of the various lenses of FIG. 1A.

The zoom lens system of the first preferred embodiment of the present invention operates faster and lighter while zooming and focusing than conventional systems by reducing the number of lenses in the second lens group 2 and the fourth lens group 4 to a minimum.

Figure 2A:
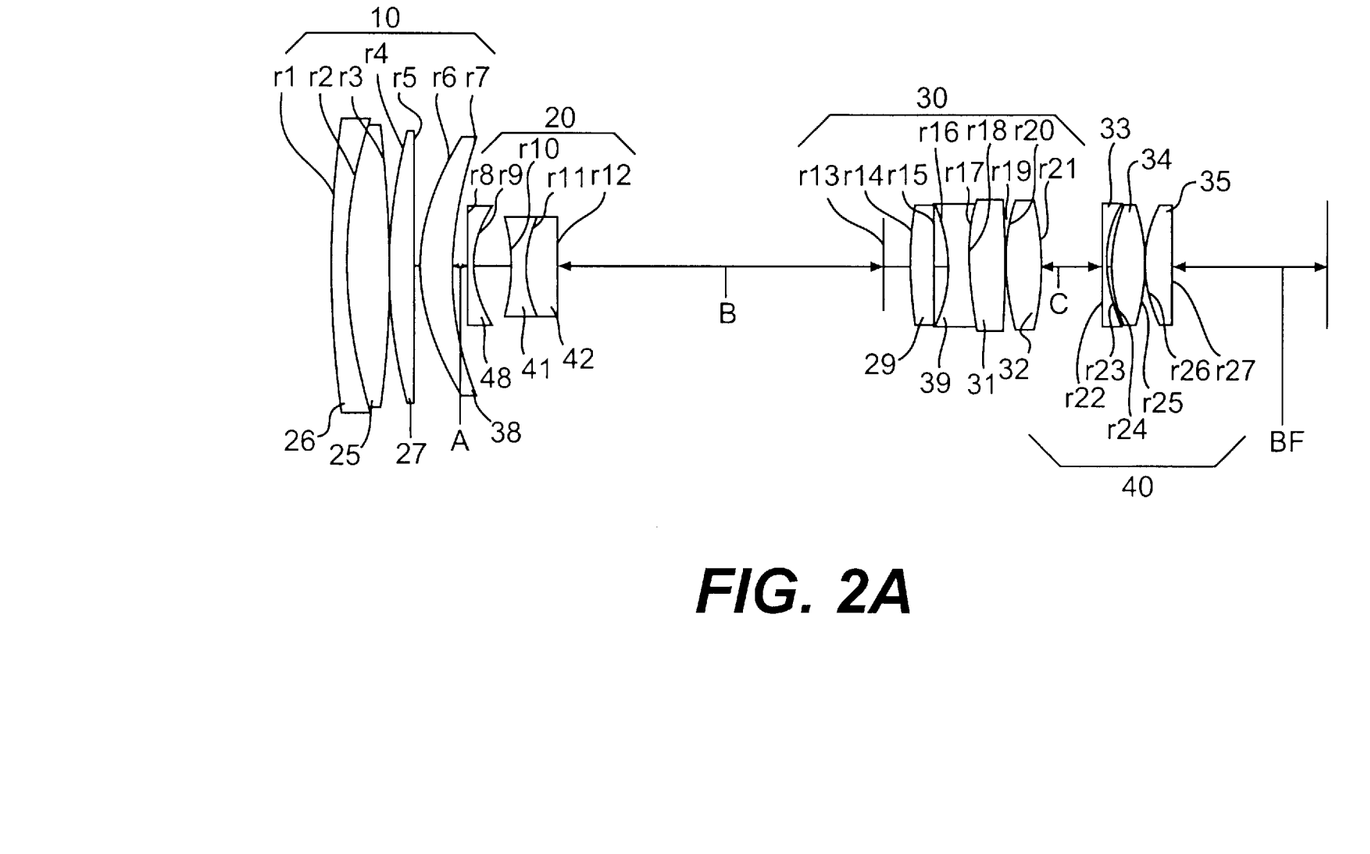
FIG. 2A is a schematic sectional view illustrating a lens group of a zoom lens system at a wide angle position in accordance with the second preferred embodiment of the present invention.

Referring to FIG. 2A, a zoom lens system in accordance with the second preferred embodiment of the present invention is explained.

As shown in FIG. 2A, a zoom lens system in accordance with the second preferred embodiment of the present invention includes a first lens group 10 of a positive refractive power viewed from the object side comprising four lenses, a second lens group 20 of a negative refractive power comprising three lenses, a third lens group 30 of a positive refractive power, and a fourth lens group 40 of a positive refractive power. Magnification is changed by moving the second lens group 20 from an object side to an image side, and focusing is accomplished by the fourth lens group 40.

Figure 2B:
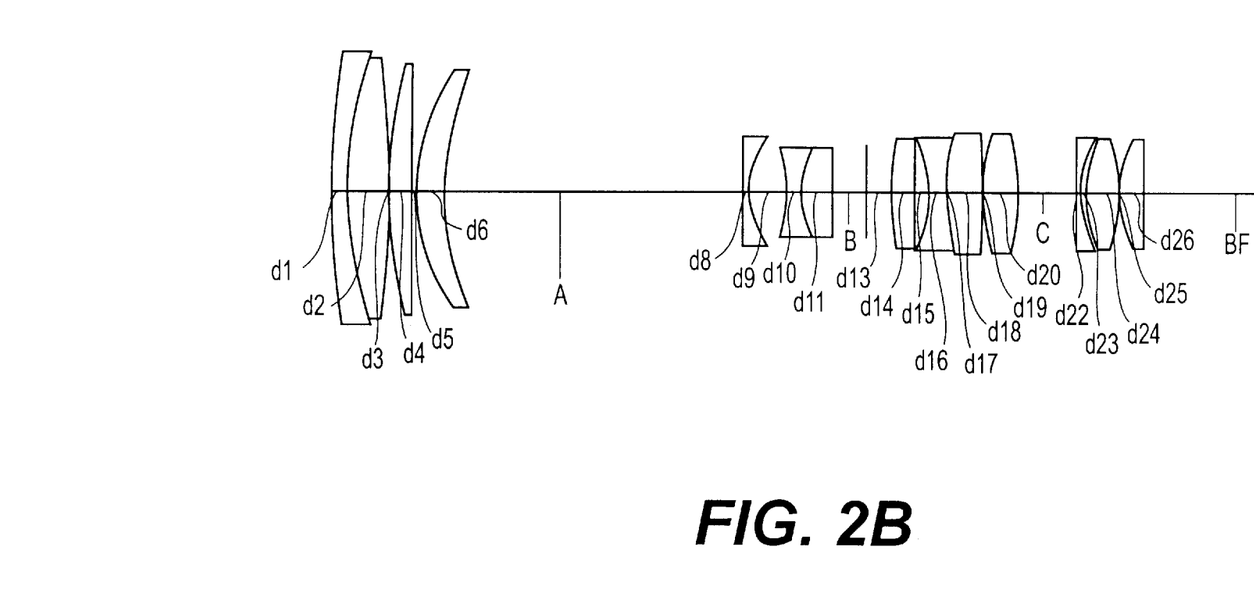
FIG. 2B is a schematic sectional view illustrating the lens group of the zoom lens system at a telephoto position in accordance with the second preferred embodiment of the present invention.

The first lens group 10 has a convex lens 25 and a concave lens 26 attached thereto, and has at least two meniscus lenses 27, 38 which are convex toward an object. The second lens group 20 includes at least three lenses 48, 41, 42. The third lens group 30 has at least one biconvex aspherical lens 32, at least one convex lens 39 and at least one concave lens 29, 31. As shown in FIG. 2A the third lens group 30 has four lenses. The fourth lens group 40 has one concave lens 33, and two convex lenses 34, 35. FIG. 2B shows the distances between and thicknesses of the various lenses of FIG. 2A.

Figure 3A:
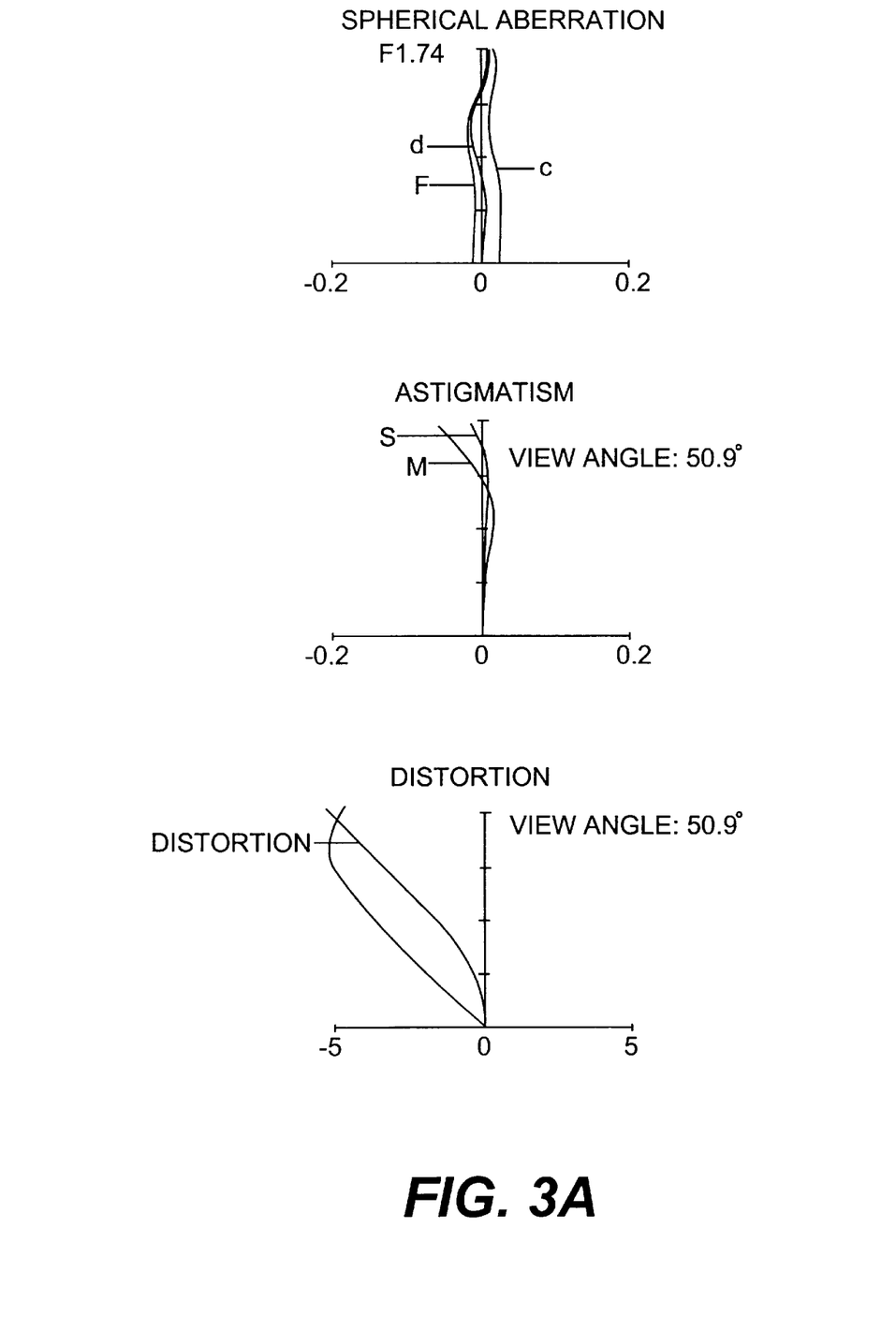
FIG. 3A illustrates aberrations of the zoom lens system at a wide angle position in accordance with the first preferred embodiment of the present invention.
Figure 3B:
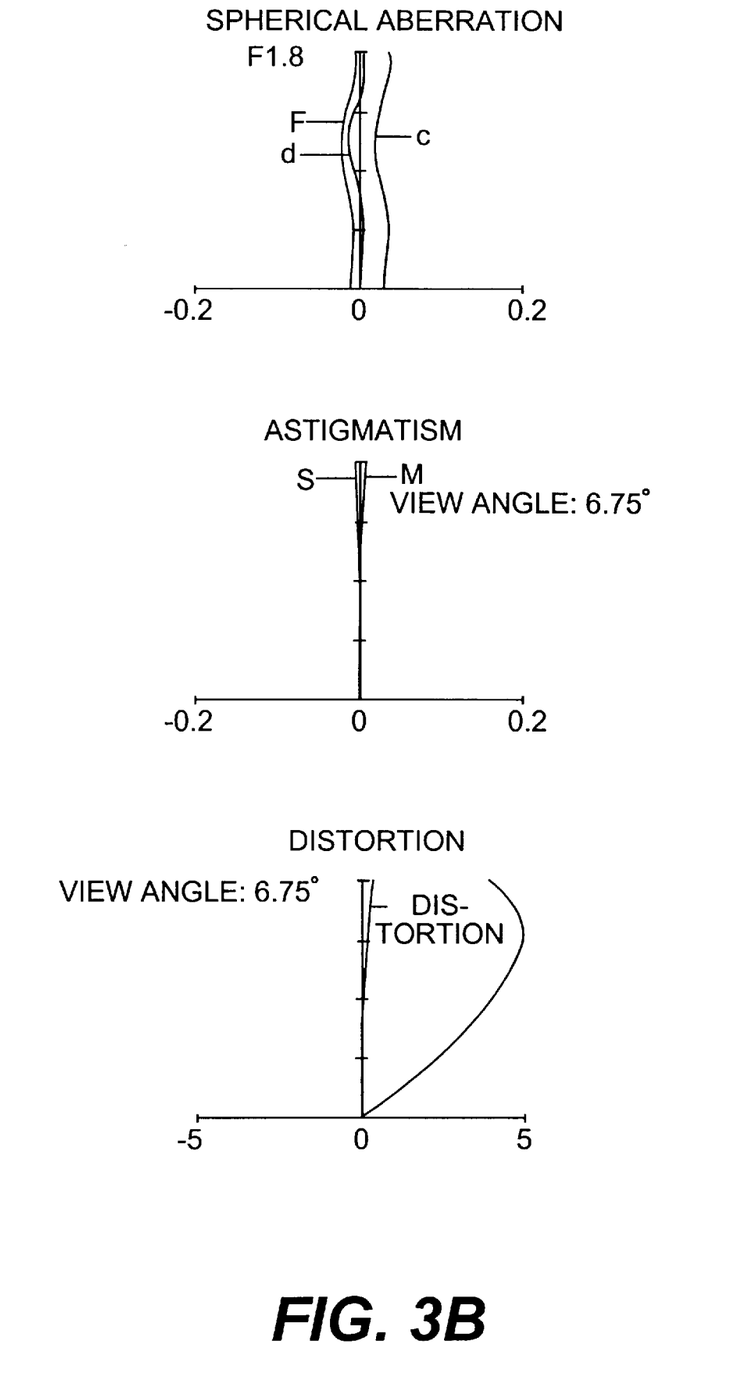
FIG. 3B illustrates aberrations of the zoom lens system at a telephoto position in accordance with the first preferred embodiment of the present invention.

FIGS. 3A and 3B illustrate spherical aberration, astigmatism, and distortion of the zoom lens according to the first preferred embodiment at a wide angle position and a telephoto position, respectively.

The operation of the zoom lens system in accordance with the second preferred embodiment of the present invention coincides with the operation of the first embodiment.

The aspherical lenses in the third lens groups 3 and 30, respectively, of the zoom lens system in accordance with the first and second preferred embodiments of the present invention compensates all aberrations, such as spherical aberrations. In addition, the zoom lens system in accordance with the first and second preferred embodiments of the present invention satisfies the following conditions:

$$2.0 < BFw/fw < 6.0 \quad (1);$$

$$7.5 < f1/fw < 12.5 \quad (2);$$

$$-3.0 < f2/fw < -1.5 \quad (3);$$

$$0.8 < f3/f4 < 1.6 \quad (4);$$

and $$55 < vd < 70 \quad (5);$$

where BFw is a back focal length at the wide angle position, fw is a focal length of the overall zoom lens of the wide angle position, f1 is a focal length of the first lens group, f2 is a focal length of the second lens group, f3 is a focal length of the third lens group, f4 is a focal length of the fourth lens group, and vd is an average dispersion of the first lens group. Following is the explanation of each condition.

Condition 1 defines an optimum back focal length of an optical system. If BFw/Fw goes below the lower limit in condition 1, a back focal length becomes too shortand this makes it difficult to insert optical elements such as a tricolor separation prism between the lenses and the CCD. A short back focal length also makes it difficult to meet the telecentric conditions.

If BFw/Fw goes beyond the upper limit, the back focal length becomes too long. A long back focal length requires larger fourth lens groups 4, 40 and makes focusing more difficult.

Condition 2 defines an optimum refractive power of the first lens groups 1 and 10. If f1/fw goes below the lower limit in condition 2, the refractive power becomes too strong. This makes it difficult to compensate all the aberrations in the telephoto mode. If f1/fw goes beyond the upper limit, the total length of the system becomes too long to obtain a compact camera system.

Condition 3 defines an optimum refractive power of the second lens groups 2 and 20. When f2/fw goes below the lower limit in condition 3, it is possible to obtain a compact camera system but it is difficult to compensate aberrations such as field curvature. If f2/fw goes beyond the upper limit, the focal length of the second lens becomes longer. Therefore, when magnification is changed, the distance by which the second lens is moved becomes longer and the total length of the system becomes longer.

Condition 4 defines an optimum refractive power of the third lens groups 3, 30 and the fourth lens groups 4, 40. If condition 4 is met, the entire optical system may be small and a long back focal length and axis pupil length may be achieved without sacrificing optical performance.

If f3/f4 goes below the lower limit in condition 4, the focal length of the third lens groups 3, 30 becomes too short. This makes it difficult to compensate the spherical aberrations while changing the magnification and focusing. Also, it becomes difficult to obtain a long back focal length. An f3/f4 exceeding the upper limit in condition 4 weakens the refractive power of the third lens groups 3 and 30 and increases the diffusion ratio of the light exiting the third lens groups 3 and 30. The increased diffusion ratio in turn requires a larger fourth lens groups 4 and 40 which makes focusing more difficult.

Condition 5 defines an optimal compensation of chromatic aberrations in the optical system. A vd lower than the lower limit in condition 5 makes it difficult to compensate a chromatic aberration on the axis and magnificative chromatic aberration at a wide angle position. It also makes it difficult to achieve a high resolution. On the other hand, a material with a vd exceeding the upper limit in condition 5 is not easy to manufacture. Therefore, it is not economical because the material cost sharply increases.

An optical axis distance from the vertex of the aspherical lens in a zoom lens system in accordance with the preferred embodiment of the present invention that satisfies the above mentioned conditions 1 to 5 is expressed by the following equation.

$$X = \frac{C \times y^2}{1 + (1 - (k+1) \times c^2 \times y^2)^{\frac{1}{2}}} + A_4 y^4 + A_6 y^6 + A_8 y^8 + A_{10} y^{10}$$

where X is an optical axis distance from the lens vertex;

y is a vertical distance of the optical axis;

c is a reciprocal of the radius of curvature at the lens vertex;

k is a conic constant;

$A_4, A_6, A_8, A_{10}$ are aspherical coefficients.

Table 1 shows the data for the first preferred embodiment of the present invention that satisfy the above-mentioned conditions. In table 1, r is a radius of curvature of the refractive surface (See FIG. 1*a*), d is a thickness of a lens or a distance between lenses (See FIG. 1B), nd is a d-line refractive index of a lens, and vd is an Abbe number of a lens.

In the first preferred embodiment of the present invention, the viewing angle 2ω varies from 50.92° to 6.75°, the F number varies from 1.74 to1.80, the length f varies from 6.67 to 50.87.

TABLE 1

| Surface No. | Radius of Curvature (r) | Thickness or Distance (d) | Refractive Power (nd) | Unit (mm) Abbe Number (vd) |
| --- | --- | --- | --- | --- |
| 1 | 161.897 | 1.50 | 1.80518 | 25.46 |
| 2 | 74.605 | 5.28 | 1.48749 | 70.44 |
| 3 | −162.293 | 0.10 | | |
| 4 | 81.722 | 3.37 | 1.49700 | 81.61 |
| 5 | 1024.646 | 0.75 | | |
| 6 | 33.098 | 3.36 | 1.48749 | 70.44 |
| 7 | 51.092 | A | | |
| 8 | −378.609 | 1.00 | 1.80610 | 33.27 |
| 9 | 13.368 | 5.48 | | |
| 10 | −28.501 | 3.50 | 1.58913 | 61.25 |
| 11 | 17.038 | 4.18 | 1.84666 | 23.78 |
| 12 | 441.577 | B | | |
| 13 | diaphragm | 2.00 | | |
| 14 | −19.979 | 1.36 | 1.72342 | 37.99 |
| 15 | 35.531 | 0.10 | | |
| 16 | 35.023 | 5.50 | 1.84666 | 23.78 |
| 17 | −65.667 | 2.11 | | |
| 18 | 22.901 | 4.48 | 1.58913 | 61.25 |
| 19* | −52.613 | C | | |
| 20 | 684.004 | 1.20 | 1.80518 | 25.46 |
| 21 | 16.968 | 0.50 | | |
| 22 | 18.587 | 3.85 | 1.48749 | 70.44 |
| 23 | −29.329 | 0.10 | | |

TABLE 1-continued

| Surface No. | Radius of Curvature (r) | Thickness or Distance (d) | Refractive Power (nd) | Unit (mm) Abbe Number (vd) |
|---|---|---|---|---|
| 24 | 21.046 | 4.50 | 1.48749 | 70.44 |
| 25 | −57.795 | D | | |
| 26 | 0.000 | 20.03 | 1.58913 | 61.25 |
| 27 | 0.000 | 7.98 | | |

In table1, * represents an aspherical surface, and A, B, C, and D represent the distances surfaces must move while changing magnification. Table 2 shows the values of A, B, C, and D.

Regarding the conic constant k and the aspherical coefficeint of the aspherical lens 19, the conic constant k is −0.8764004667191E+02 and the aspherical coefficient $A_4$ is −0.4020140177956E−04, the aspherical coefficeint $A_6$ is 0.8936184893342E−06 and the aspherical coefficeint $A_{10}$ is 0.3621366674970E−10.

TABLE 2

| Zoom Interval | Wide Angle Position | Normal Position | Unit (mm) Telephoto Position |
|---|---|---|---|
| A | 3.75 | 32.32 | 40.11 |
| B | 39.75 | 11.18 | 3.39 |
| C | 8.06 | 5.57 | 6.94 |
| D | 1.01 | 3.50 | 2.13 |

Table 3 shows the data for the second preferred embodiment of the present invention that satisfy the above-mentioned conditions and equations. In table 3, r is a radius of curvature of the refractive surface (See FIG. 2A), d is a thickness of a lens or a distance between lenses (See FIG. 2B), nd is a d-line refractive index of a lens, and vd is an Abbe number of a lens.

In the second preferred embodiment of the present invention, the viewing angle 2ω varies from 51.20° to 6.75°, the F number varies from 1.44 to 1.54 and the focal length f varies from 8.90 to 67.50.

TABLE 3

| Surface No. | Radius of Curvature (r) | Thickness or Distance (d) | Refractive Power (nd) | Unit (mm) Abbe Number (vd) |
|---|---|---|---|---|
| 1 | 139.597 | 3.00 | 1.80518 | 25.46 |
| 2 | 77.142 | 7.97 | 1.48000 | 71.41 |
| 3 | −237.861 | 0.10 | | |
| 4 | 119.703 | 4.00 | 1.49700 | 81.61 |
| 5 | 1222.790 | 0.61 | | |
| 6 | 43.018 | 5.00 | 1.48000 | 74.12 |
| 7 | 59.733 | A | | |
| 8 | −253.273 | 0.85 | 1.82880 | 35.82 |
| 9 | 18.547 | 6.00 | | |
| 10 | −32.892 | 3.00 | 1.58913 | 61.25 |
| 11 | 23.227 | 5.50 | 1.84666 | 23.78 |
| 12 | −397.275 | B | | |
| 13 | Diaphragm | 5.00 | | |
| 14 | 78.596 | 4.00 | 1.80518 | 25.46 |
| 15 | 268.853 | 2.74 | | |
| 16 | −23.844 | 3.48 | 1.66885 | 32.13 |
| 17 | 53.526 | 0.10 | | |
| 18 | 46.698 | 6.50 | 1.84666 | 23.78 |
| 19 | −259.334 | 0.10 | | |
| 20 | 37.446 | 6.50 | 1.58918 | 61.25 |
| 21* | −56.621 | C | | |
| 22 | 180.833 | 0.85 | 1.80518 | 25.46 |

TABLE 3-continued

| Surface No. | Radius of Curvature (r) | Thickness or Distance (d) | Refractive Power (nd) | Unit (mm) Abbe Number (vd) |
|---|---|---|---|---|
| 23 | 23.684 | 0.85 | | |
| 24 | 26.120 | 6.13 | 1.48000 | 71.41 |
| 25 | −35.338 | 0.10 | | |
| 26 | 25.393 | 4.49 | 1.48000 | 71.41 |
| 27 | 1996.261 | BF | | |

In table 3, * represents the aspherical surface, and A, B, C, and BF represent the moving distances between surfaces while changing magnification. Table 4 shows the values of A, B, C, and BF.

Regarding the conic constant k and aspherical coefficient of the aspherical lens 21, the conic constant k is −0.3195429749389E+02 and the aspherical coefficient $A_4$ is −0.9110618017821E−05, the aspherical coefficient $A_6$ is 0.78881080822642E−07, the aspherical coefficient $A_8$ is −35666603128E−09, and the aspherical coefficient $A_{10}$ is 0.3838177651254E−12.

TABLE 4

| Zoom Interval | Wide Angle Position | Normal Position | Unit (mm) Telephoto Position |
|---|---|---|---|
| A | 2.89 | 43.12 | 53.89 |
| B | 57.00 | 16.77 | 6.00 |
| C | 9.86 | 6.01 | 7.40 |
| BF | 29.99 | 33.85 | 32.46 |

Figure 4A:
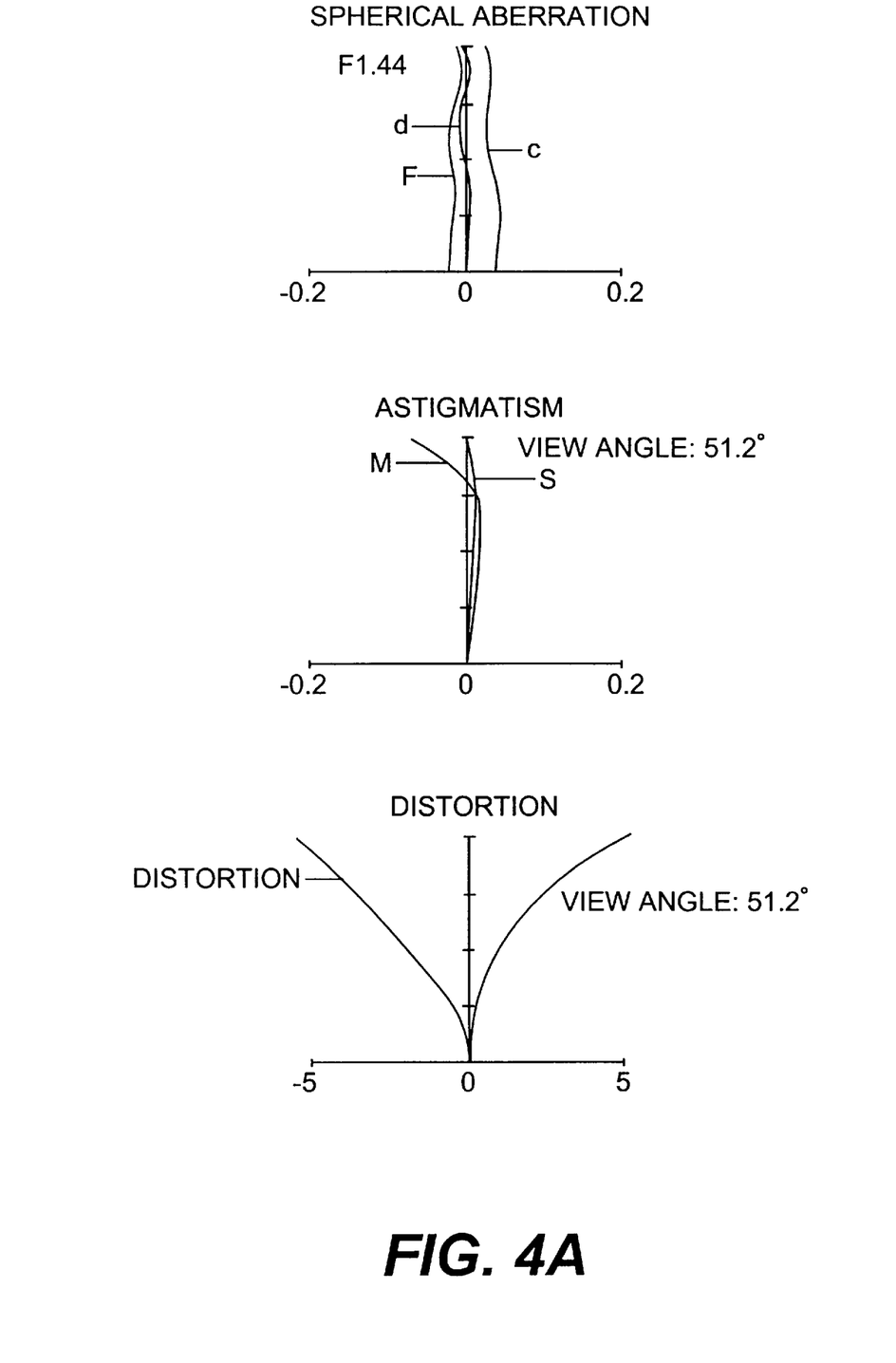
FIG. 4A illustrates aberrations of the zoom lens system at a wide angle position in accordance with the second preferred embodiment of the present invention.
Figure 4B:
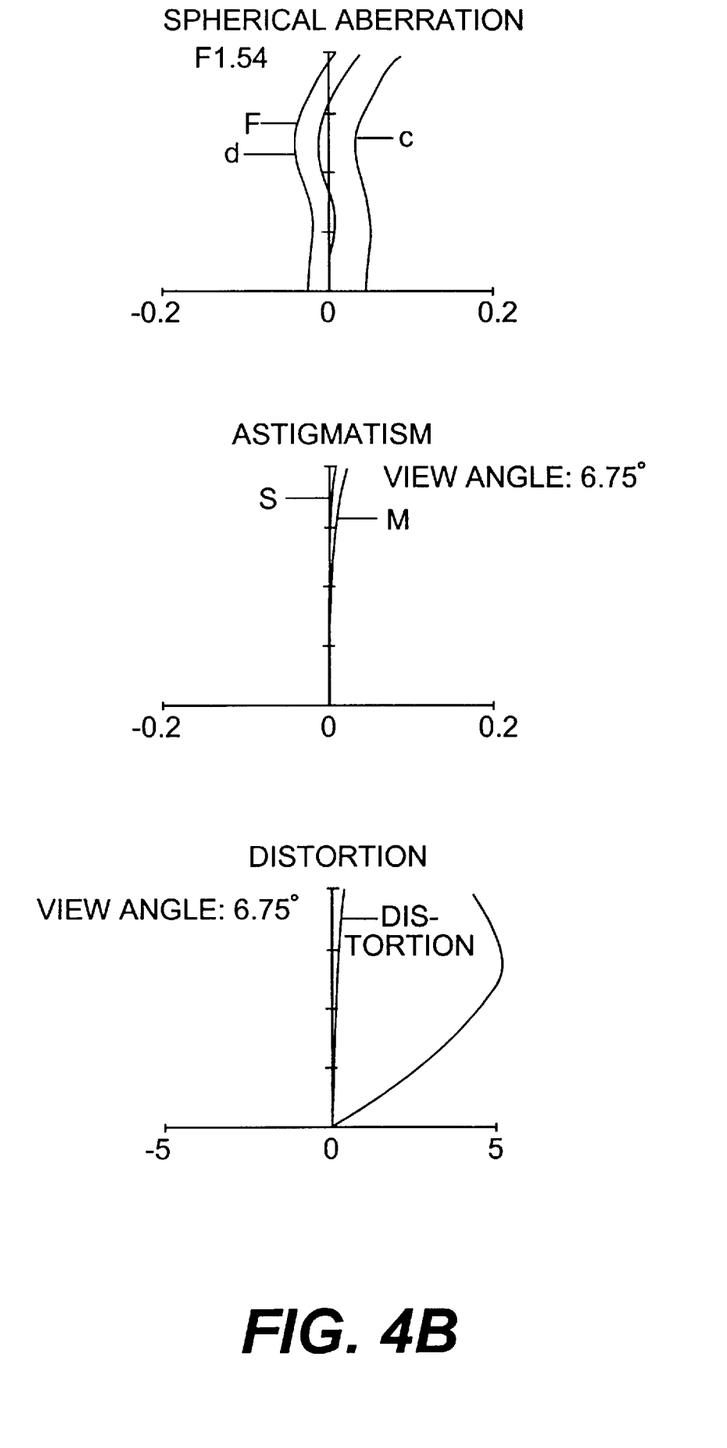
FIG. 4B illustrates aberrations of the zoom lens system at a telephoto position in accordance with the second preferred embodiment of the present invention.

FIGS. 4A and 4B illustrate spherical aberration, astigmatism, and distortion of the zoom lens according to the second preferred embodiment at a wide angle position and a telephoto position, respectively.

As described above, the zoom lens system in accordance with the preferred embodiments of the present invention is compact in size while achieving a long back focal length with a high magnification and a high aperture ratio. At the same time, the excellent compensation of all aberrations in the entire zooming range enables the system to achieve a high resolution of more than 100 pixel/mm, which can be used for a high-resolution (definition) television.

While it has been shown and described what is at present the preferred embodiments of the invention, it will be obvious to those skilled in the art that various changes and modifications can be readily made therein without departing from the scope and spirit of the invention as defined by the appended claims.

What is claimed is:

1. A zoom lens system, comprising,
   a first lens group of a positive refractive power having a concave lens, a convex lens adhered thereto and at least two meniscus lenses whose entrance surfaces are convex;
   a second lens group of a negative refractive power;
   a third lens group of a positive refractive power having at least one biconvex aspherical lens, at least one convex lens, and at least one concave lens; and
   a fourth lens group of a positive refractive power having one concave lens and two convex lenses,
   wherein the second lens group is movable for magnification change, and the fourth lens group is movable according to the movement of the second lens group for compensating a position of an image plane for focusing an image, and wherein $2.0 < BFw/fw < 6.0$
$7.5 < f1/fw < 12.5$
$-3.0 < f2/fw < -1.5$
$0.8 < f3/f4 < 1.6$
$55 < vd < 70$ where BFw is a back focal length at the wide angle position,
fw is a focal length of the overall zoom lens system at the wide angle position,
f1 is a focal length of the first lens group,
f2 is a focal length of the second lens group,
f3 is a focal length of the third lens group,
f4 is a the focal length of the fourth lens group, and
vd is an average dispersion ratio of the first lens group.

2. The zoom lens system of claim 1,
wherein the second lens group includes a concave lens having a concave entrance surface, and a biconcave lens and a biconvex lens adhered thereto.

3. The zoom lens system of claim 1,
wherein the biconvex aspherical lens of the third lens group has a spherical entrance surface and an aspherical exit surface.

* * * * *